US011449515B1

(12) United States Patent
Russell

(10) Patent No.: US 11,449,515 B1
(45) Date of Patent: Sep. 20, 2022

(54) CROWD SOURCED DATABASE SYSTEM

(71) Applicant: Grant Michael Russell, Stanford, CA (US)

(72) Inventor: Grant Michael Russell, Stanford, CA (US)

( * ) Notice: Subject to any disclaimer, the term of this patent is extended or adjusted under 35 U.S.C. 154(b) by 0 days.

(21) Appl. No.: 16/900,665

(22) Filed: Jun. 12, 2020

Related U.S. Application Data

(60) Provisional application No. 62/861,962, filed on Jun. 14, 2019.

(51) Int. Cl.
| G06F 16/2457 | (2019.01) |
| G06F 16/215 | (2019.01) |
| G06F 16/248 | (2019.01) |
| G06N 20/10 | (2019.01) |
| G06N 5/00 | (2006.01) |

(52) U.S. Cl.
CPC ...... *G06F 16/24578* (2019.01); *G06F 16/215* (2019.01); *G06F 16/248* (2019.01); *G06N 5/003* (2013.01); *G06N 20/10* (2019.01)

(58) Field of Classification Search
CPC ............. G06F 16/24578; G06F 16/215; G06F 16/248; G06N 20/10; G06N 5/003
See application file for complete search history.

(56) References Cited

U.S. PATENT DOCUMENTS

| 8,386,308 | B2 * | 2/2013 | Kansal | ............... | H04L 67/1097 |
| | | | | | 705/14.19 |
| 8,706,809 | B2 | 4/2014 | Brandon et al. | | |
| 9,254,092 | B2 | 2/2016 | David et al. | | |
| 9,305,263 | B2 | 4/2016 | Eric et al. | | |
| 9,418,355 | B2 | 8/2016 | Shah | | |
| 9,430,299 | B2 | 8/2016 | Yehuda et al. | | |
| 9,881,313 | B2 | 1/2018 | Bohra | | |
| 9,911,088 | B2 | 3/2018 | Nath | | |
| 9,953,088 | B2 | 4/2018 | Gruber | | |
| 10,002,177 | B1 | 6/2018 | Mcclintock | | |
| 10,073,923 | B2 | 9/2018 | Koren | | |
| 2010/0057718 | A1 * | 3/2010 | Kulkarni | ............... | G06F 16/951 |
| | | | | | 707/E17.071 |
| 2011/0040662 | A1 | 2/2011 | Kurtzig | | |

(Continued)

OTHER PUBLICATIONS

Dwork et al., "Calibrating Noise to Sensitivity in Private Data Analysis," In: Halevi S., Rabin T. (eds) Theory of Cryptography. TCC 2006. Lecture Notes in Computer Science, vol. 3876. Springer, Berlin, Heidelberg (2006).

*Primary Examiner* — Irete F Ehichioya
*Assistant Examiner* — Ken Hoang
(74) *Attorney, Agent, or Firm* — Knobbe, Martens, Olson & Bear, LLP

(57) ABSTRACT

Systems and methods are provided to improve data sets and/or data set collection. An entity submits a request for a data set crowd sourced database system. Contributor(s) work to complete the data set, such as by submitting components of the data set. Multiple separate users contributing to a data set improves the diversity of a data set. The crowd sourced database system ranks contributing users using a ranking algorithm based on the previous submissions of a user. The crowd sourced database system ranks contributions based on the quality of the data submitted. The crowd sourced database system anonymizes data contributions where data privacy considerations are required or are important.

16 Claims, 12 Drawing Sheets

(56) References Cited

U.S. PATENT DOCUMENTS

| | | |
|---|---|---|
| 2012/0096089 A1 | 4/2012 | Barash |
| 2012/0101847 A1 | 4/2012 | Johnson |
| 2012/0245952 A1 | 9/2012 | Halterman |
| 2012/0278097 A1 | 11/2012 | Ghouri |
| 2013/0030832 A1 | 1/2013 | Heyman |
| 2013/0066818 A1 | 3/2013 | Assadollahi |
| 2013/0066961 A1 | 3/2013 | Naik et al. |
| 2013/0132308 A1 | 5/2013 | Boss |
| 2013/0171605 A1* | 7/2013 | Tang ................. G09B 5/00 434/352 |
| 2013/0253940 A1 | 9/2013 | Zziwa |
| 2013/0332194 A1 | 12/2013 | D'Auria |
| 2014/0073880 A1 | 3/2014 | Boucher |
| 2014/0074638 A1 | 3/2014 | Shah |
| 2014/0279780 A1* | 9/2014 | Dasgupta ............. G06N 5/02 706/46 |
| 2014/0316235 A1 | 10/2014 | Davis |
| 2015/0242447 A1* | 8/2015 | Ipeirotis ......... G06Q 30/0246 705/14.45 |
| 2015/0278403 A1 | 10/2015 | Gil |
| 2015/0356265 A1 | 12/2015 | Chiu |
| 2015/0363481 A1 | 12/2015 | Haynes |
| 2015/0370985 A1 | 12/2015 | Carvalko |
| 2016/0162478 A1 | 6/2016 | Blassin |
| 2016/0162837 A1 | 6/2016 | Muntés Mulero |
| 2016/0283678 A1 | 9/2016 | Ram |
| 2017/0177807 A1 | 6/2017 | Fabian |
| 2017/0228807 A1* | 8/2017 | Galindo ............... H04L 67/10 |
| 2017/0249566 A1 | 8/2017 | Mandel |
| 2018/0107802 A1 | 4/2018 | Satterwhite |
| 2018/0129786 A1 | 5/2018 | Khine |
| 2018/0181914 A1 | 6/2018 | Crabtree et al. |
| 2018/0204111 A1 | 7/2018 | Zadeh |
| 2018/0288213 A1 | 10/2018 | Bjontegard |
| 2018/0293629 A1 | 10/2018 | Roman |
| 2019/0130129 A1* | 5/2019 | Huang ............... G06F 16/285 |

* cited by examiner

≡ Dive                     Log Out   About Us

Profile Information — Dataset Information — Contract Information — Payment — Done

Dataset Information
Dataset Title

Lidar

Dataset Description

Type of data you are collecting, how you wish data to be presented, gathered, etc.

Upload Sample

| # | Thumbnail | Name | Action |
|---|-----------|------|--------|

Drop files anywhere to upload
or
[Select Files]

| ≫ Dive | | | Log Out   About Us |
|---|---|---|---|
| | | Contribute | |
| # | Name | Category | Budget 402 |
| 283 | Cerulean - Cat Recognition | Other | $50,000 404 |
| 284 | NASA - Mars Mission | Space | $75,000 406 |
| 285 | Lidar Imaging | Automotive/Autonomous Vehicle | $25,000 |

| # | Thumbnail | Name | Action |
|---|---|---|---|
| 0 | | | Action ▽ |
| 1 | 🖼 | img1.jpeg 100.00% | Action ▽ |
| 2 | 🖼 | img2.jpeg 100.00% | Action ▽ |
| 3 | 🖼 | img3.jpeg 100.00% | Action ▽ |
| 4 | 🖼 | img4.jpeg 100.00% | Action ▽ |
|   | 🖼 | img5.jpeg 100.00% |   |

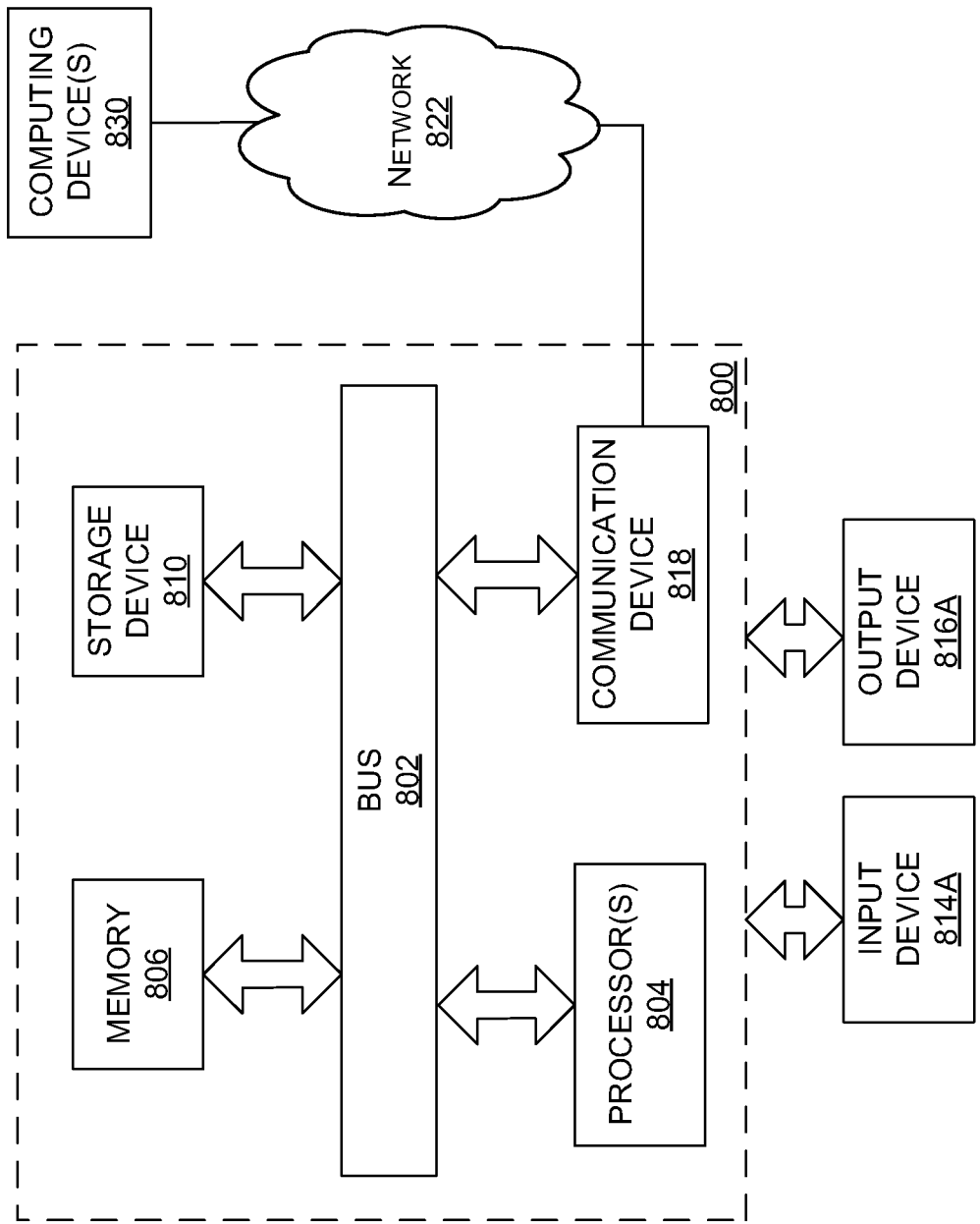

CROWD SOURCED DATABASE SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 62/861,962 entitled "Crowd Sourced Database System" filed Jun. 14, 2019, which is hereby incorporated by reference in its entirety.

BACKGROUND

The solutions to many of today's technological problems can rely on data sets as input. For example, in the artificial intelligence field, data sets can be used as input to train machine learning models or classifiers. When an entity desires a data set, common methods of collecting data include using an internal team or a third-party contractor to collect or create the data set.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a system is disclosed comprising: a non-transitory computer storage medium configured to at least store computer-executable instructions; and one or more computer hardware processors in communication with the non-transitory computer storage medium, the one or more computer hardware processors configured to execute the computer-executable instructions to at least: receive a data set request; publish, in a data set contributions graphical user interface, the data set request, wherein to publish the data set request further comprises: cause presentation of the data set request in the data set contributions graphical user interface to a first user computing device associated with a first user profile; receive, from the first user computing device, first contributions data associated with the data set request; determine a first quality score for the first contributions data; and determine a first ranking of the first user profile based at least in part on the first quality score.

According to yet another aspect, the one or more computer hardware processors may be further configured to: generate a ranking model comprising: a first feature corresponding to a user based ranking of contributions data; a second feature corresponding to a similarity between first contributions data and second contributions data; a third feature corresponding to time spent using a graphical user interface; a fourth feature corresponding to a diversity between third contributions data and fourth contributions data; and a fifth feature corresponding to a quantity of submitted contributions data, wherein to determine the first ranking of the first user profile further comprises: apply the ranking model to the first user profile that generates the first ranking.

According to yet another aspect, the one or more computer hardware processors may be further configured to: train a ranking model using a training set comprising a plurality of training contributions data, wherein to train the ranking model further comprises an application of at least the following plurality of features on the training set: a first feature corresponding to a user based ranking of contributions data; a second feature corresponding to a similarity between first training contributions data and second training contributions data; a third feature corresponding to time spent using a graphical user interface; a fourth feature corresponding to a diversity between third training contributions data and fourth training contributions data; and a fifth feature corresponding to a quantity of submitted contributions data, wherein to determine the first ranking of the first user profile further comprises: apply the ranking model to the first user profile that generates the first ranking.

According to yet another aspect, to train the ranking model may further comprise: train a first decision tree from a first subset of the plurality of features; train a second decision tree from a second subset of the plurality of features; and generate a combined decision tree from the first decision tree and the second decision tree, wherein the ranking model comprises the combined decision tree.

According to yet another aspect, the one or more computer hardware processors may be further configured to: cause presentation, in a user interface, of the first ranking.

According to yet another aspect, the one or more computer hardware processors may be further configured to: determine that the first ranking exceeds a threshold associated with a second data request; authorize access to the second data request for the first user profile; and cause presentation of the second data set request in the data set contributions graphical user interface to the first user computing device associated with the first user profile.

According to yet another aspect, the one or more computer hardware processors may be further configured to: determine a first compensation amount for the first user profile based at least in part on the first quality score.

According to yet another aspect, the first contributions data may comprise a first data subset of a first data type and a second data subset of a second data type, wherein the one or more computer hardware processors may be further configured to: generate, from the first data subset, first anonymized data according to a first epsilon threshold for the first data type; and generate, from the second data subset, second anonymized data according to a second epsilon threshold for the second data type.

According to another embodiment, a computer-implemented method is disclosed comprising: receiving a data set request; publishing, in a data set contributions graphical user interface, the data set request, wherein publishing the data set request further comprises: causing presentation of the data set request in the data set contributions graphical user interface to a first user computing device associated with a first user profile; receiving, from the first user computing device, first contributions data associated with the data set request; determining a first quality score for the first contributions data; and determining a first ranking of the first user profile based at least in part on the first quality score.

According to an aspect, the data set request may comprise a description of a type of data requested.

According to another aspect, the first quality score may comprise a user generated rating of the quality of at least some of the first contributions data.

According to yet another aspect, the first ranking may comprise a score.

According to yet another aspect, the computer-implemented method may further comprise: generating a ranking model comprising: a first feature corresponding to a user based ranking of contributions data; a second feature corresponding to a similarity between first contributions data and second contributions data; a third feature corresponding to time spent using a graphical user interface; a fourth feature corresponding to a diversity between third contributions data and fourth contributions data; and a fifth feature corresponding to a quantity of submitted contributions data, wherein determining the first ranking of the first user profile further comprises: applying the ranking model to the first user profile that generates the first ranking.

According to yet another aspect, the computer-implemented method may further comprise: training a ranking model using a training set comprising a plurality of training contributions data, wherein training the ranking model further comprises an application of at least the following plurality of features on the training set: a first feature corresponding to a user based ranking of contributions data; a second feature corresponding to a similarity between first training contributions data and second training contributions data; a third feature corresponding to time spent using a graphical user interface; a fourth feature corresponding to a diversity between third training contributions data and fourth training contributions data; and a fifth feature corresponding to a quantity of submitted contributions data, wherein determining the first ranking of the first user profile further comprises: applying the ranking model to the first user profile that generates the first ranking.

According to yet another aspect, training the ranking model may further comprise: training a first decision tree from a first subset of the plurality of features; training a second decision tree from a second subset of the plurality of features; and generating a combined decision tree from the first decision tree and the second decision tree, wherein the ranking model comprises the combined decision tree.

According to yet another aspect, the ranking model may comprise at least one of: a random forest model, a decision tree, or a support vector machine.

According to yet another aspect, the computer-implemented method may further comprise: causing presentation, in a user interface, of the first ranking.

According to yet another aspect, the computer-implemented method may further comprise: determining that the first ranking exceeds a threshold associated with a second data request; authorizing access to the second data request for the first user profile; and causing presentation of the second data set request in the data set contributions graphical user interface to the first user computing device associated with the first user profile.

According to yet another aspect, the computer-implemented method may further comprise: determining a first compensation amount for the first user profile based at least in part on the first quality score.

According to yet another aspect, the data set request may comprise a request for at least one of image data, sensor data, medical data, geolocation data, financial data, social media data, user review data, textual data, natural language processing related data, or vehicle data, or agriculturally related data.

According to yet another aspect, the first contributions data may comprise a first data subset of a first data type and a second data subset of a second data type, the computer-implemented method further comprising: generating, from the first data subset, first anonymized data according to a first epsilon threshold for the first data type; and generating, from the second data subset, second anonymized data according to a second epsilon threshold for the second data type.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. The following is a brief description of each of the drawings.

FIGS. 2, 3A, 3B, 4A, 4B, 4C, and 4D depict example graphical user interfaces, according to some embodiments of the present disclosure.

FIG. 8 illustrates an example computing system with which some embodiments of the present disclosure may be implemented.

DETAILED DESCRIPTION

Figure 1:
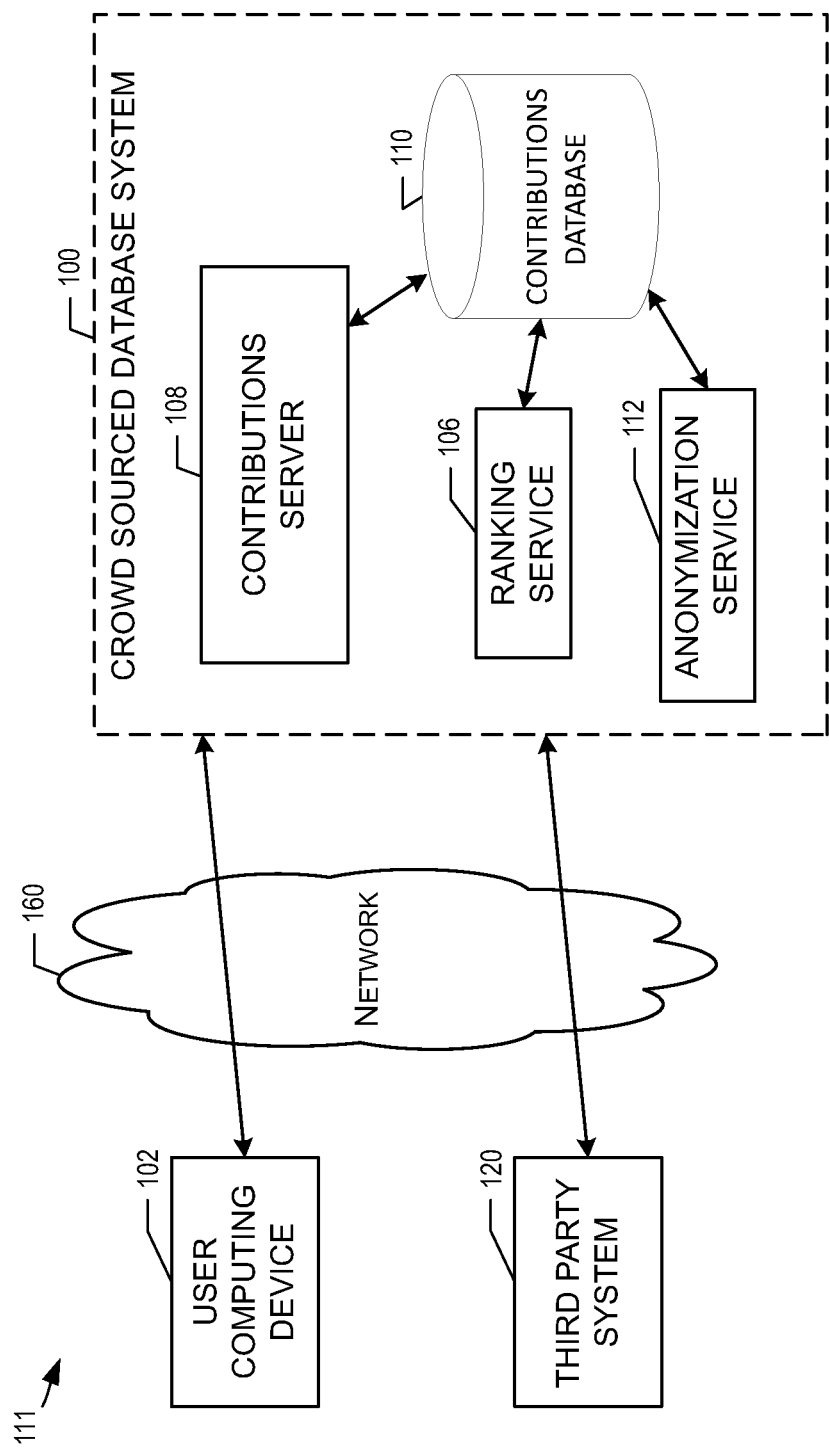
FIG. 1 illustrates a crowd sourced database system, according to some embodiments of the present disclosure.

As described above, an entity may want a data set. Typically, a single source, such as an internal team or a third-party contractor, prepares the data set. Entities also often desire data sets that are large and/or diverse. However, a disadvantage of using an internal team or a contractor to provide the data set is often the lack of diversity within the data because the data is from a single source.

Disclosed herein are systems and methods that may be used to advantageously improve data sets and/or data set collection. With a crowd sourced database system, an entity can submit a request for a data set. Contributor(s) can work to complete the data set, such as by submitting components of the data set. Having a user that is different from the requesting entity contribute to a data set can advantageously improve the diversity of the data set. Moreover, multiple separate users contributing to a data set can further improve the diversity of a data set. The crowd sourced database system can rank contributing users using a ranking algorithm based on the previous submissions of a user. The crowd sourced database system can rank contributions based on the quality of the data submitted, among other factors. The crowd sourced database system can anonymize data contributions where data privacy may be advisable, regulated, and/or important.

In the context of machine learning applications, which often is referred to as artificial intelligence, data sets can be used as input to machine learning models. Diverse data sets can be helpful to allow machine learning to generalize well. As described herein, obtaining diverse data sets with in-house teams and/or contractors can be difficult to achieve. Crowdsourcing can address some of these issues by gaining diversity through receiving submissions from different sources. If, for example, a researcher requested a data set for images trees, it would be incredibly difficult for a contractor to go and find thousands of different species of trees, in even more thousands of different lighting and staging scenarios. Through crowdsourcing, which can potentially involve multiple sources across the world, users can submit different species of trees, with different cameras at different times of the day. This can lead to high quality and/or valuable datasets that would otherwise be very difficult to collect. One example type of data that can be requested through a crowd sourced database system can be image data. However, the systems and methods described herein of crowd sourcing data sets can include other types of data, such as, but not limited to, sensor data, medically related data, clinically related data, geolocation data, financial data, social media data, sentiment or user review data, textual data, natural language processing related data, vehicle or transportation data, and/or agriculturally related data.

In the context of a crowd sourced database system, an issue can arise regarding measuring data quality. Measuring data quality can be used for purposes such as compensating contributing users and/or specifying a minimum ranking that a user must have to submit data for a particular data request. For example, a data set request can include a compensation amount. A user can be compensated based on their contributions and/or the quality of their contributions. For example, a user can be proportionally compensated (or compensated based on some other formula) based on some combination of how much data was contributed to the request and/or quality of their contributions. As described herein, the quality of contributions data can be measured in various ways.

Accordingly, the systems and techniques described herein may improve computer ranking and/or database technology. An algorithm can be used to rank the quality of contributions data and/or a user profile that has contributed data. Machine learning techniques, such as, supervised or semi-supervised machine learning (which can include a random forest model, decision trees, or a support vector machine, for example) can be used to determine a ranking. The machine learning techniques can take into account a number of features, such as how other users have rated the quality of their submissions, how similar their submissions are to previous submissions (across a single user and/or multiple users), overall time spent on the platform, diversity of data, and an amount of data submitted to the platform. Thus, the systems, techniques, and/or algorithms disclosed herein can improve crowd sourced database technology by efficiently providing ranking of user profiles and/or contributions data. The systems, techniques, and/or algorithms disclosed herein can also improve data set collection technologies by enabling faster and more varied data set collection using the particular crowd sourced framework and/or graphical user interfaces disclosed herein.

A crowd sourced database system may also implicate data privacy issues. For example, some contributions data (such as medically related data) should be untraceable back to its origin or user. Thus, the systems and techniques described herein may address data privacy issues by applying algorithms to obscure or otherwise anonymize the data while maintaining the usefulness of the data. The systems and techniques described herein may also address data permissions and authorization issues by requesting and storing opt-in information and automatically receiving data from a third party that hosts user data.

As mentioned above, the systems and methods described herein for crowd sourcing data sets can be applied to an agricultural context. For example, vegetation can be quantified with an index, such as the Normalized Difference Vegetation Index (NDVI), which measures the difference between near-infrared (which vegetation strongly reflects) and red light (which vegetation absorbs). Satellite imagery can capture infrared values. NDVI can be calculated from the infrared values to identify the amount of chlorophyll in a plot, which can be correlated to crop health. Accordingly, satellite imagery can be overlaid with crop map data to predict crop yields for specific crop types. With a crowd sourced database system, diverse data sets can be acquired in the agricultural context. For example, the crowd sourced database system can facilitate acquiring self-reported data from individual farmers on crop health, general sentiment of a farmer towards their crop growth, and/or data provided from sensors (such as infrared cameras for NDVI computation) monitoring crops (such as sensors planted in the farmer's field). Sensor data from a few sensors in a particular region could greatly improve crop yield prediction accuracy because crop growth success or failure for multiple plots in the same region can be correlated for a particular season.

FIG. 1 illustrates a crowd sourced database system 100, according to some embodiments of the present disclosure. In the embodiment of FIG. 1, the computing environment 111 can include a network 160, a crowd sourced database system 100, a user computing device 102, and one or more third party system(s) 120. Various communications between these devices are illustrated. For example, the user computing device 102 may send user input, such as contribution data, to the crowd sourced database system 100. The user computing device 102 may enable a user to interact with a graphical user interface, such as the graphical user interfaces 200, 300, 350, 360, 400, 420, 440 and 460 of FIGS. 2, 3A, 3B, 4A, 4B, 4C, and 4D, respectively. The crowd sourced database system 100 may receive data, which has been authorized by a user, from the third party system 120.

The crowd sourced database system 100 can include a ranking service 106, a contributions server 108, a contributions database 110, and an anonymization service 112. The contributions server 108 can cause presentation of a graphical user interface, as described herein. The contributions server 108 can receive user interaction data from the user computing device 102, such as contributions to a data set or requests for data sets. The contributions server 108 may communicate directly with the contributions database 110, such as by transmitting contributions data for storage in the database 110 and/or by executing queries to retrieve contributions related data. The ranking service 106 can access some data from the contributions database 110, such as data related to contributions for ranking purposes. The contributions server 108 can present some of the ranking data generated by the ranking service 106 and/or otherwise use the generated ranking data. The anonymization service 112 can anonymize some contributions data for storage in the contributions database 110. The crowd sourced database system 100 may communicate with the third party system 120, such as by receiving contributions data.

The third party system 120 can include medically related systems, such as a hospital or provider network that includes an electronic health records system. A user can authorize use of their medical records by the crowd sourced database system 100, which can be for some compensation. Once authorized, the crowd sourced database system 100 can receive contributions data from the third party system 120, such as test results or imaging data for a patient.

The contributions database 110 can include any data structure (and/or combinations of multiple data structures) for storing and/or organizing data, including, but not limited to, relational databases (e.g., Oracle databases, mySQL databases, Microsoft SQL Server databases, Microsoft Azure SQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. The terms "database," "table," and "data source" may be used interchangeably in the present disclosure.

A data store can include computer readable non-transitory storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

FIGS. 2, 3A, 3B, 4A, 4B, 4C, and 4D illustrate example user interfaces of a crowd sourced database system, according to some embodiments of the present disclosure. In particular, FIGS. 2, 3A, 3B, 4A, 4B, 4C, and 4D illustrate example user interfaces of the crowd sourced database system 100 described above with respect to FIG. 1. In various embodiments, aspects of the user interfaces may be rearranged from what is shown and described below, and/or particular aspects may or may not be included. The embodiments described below in reference to FIGS. 2, 3A, 3B, 4A, 4B, 4C, and 4D provide example user interfaces of a crowd sourced database system. In some embodiments, the user interfaces described herein, such as the user interfaces 200, 300, 350, 360, 400, 420, 440 and/or 460 of FIGS. 2, 3A, 3B, 4A, 4B, 4C, and/or 4D can be presented within a web browser application. However, in other embodiments, the user interfaces described herein are not presented within a web browser application, such as by being presented within a mobile or desktop application.

Figure 2:
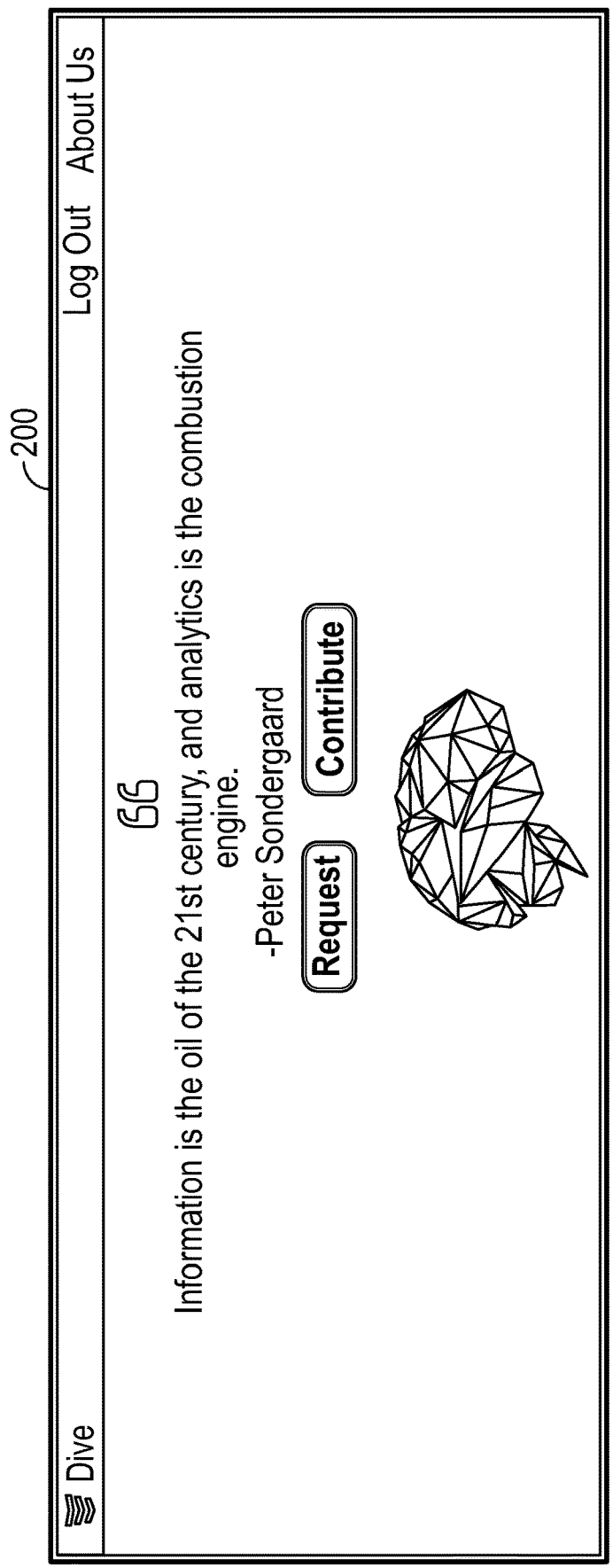

FIG. 2 illustrates an example starting user interface 200 of the crowd sourced database system 100. The graphical user interface 200 can be an example landing page for users. The graphical user interface 200 can be used to request or submit data sets. For example, an entity, such as a company, researcher, or individual can submit a request for a data set. Alternatively, a user can use the graphical user interface 200 to contribute to a data set.

Figure 3A:
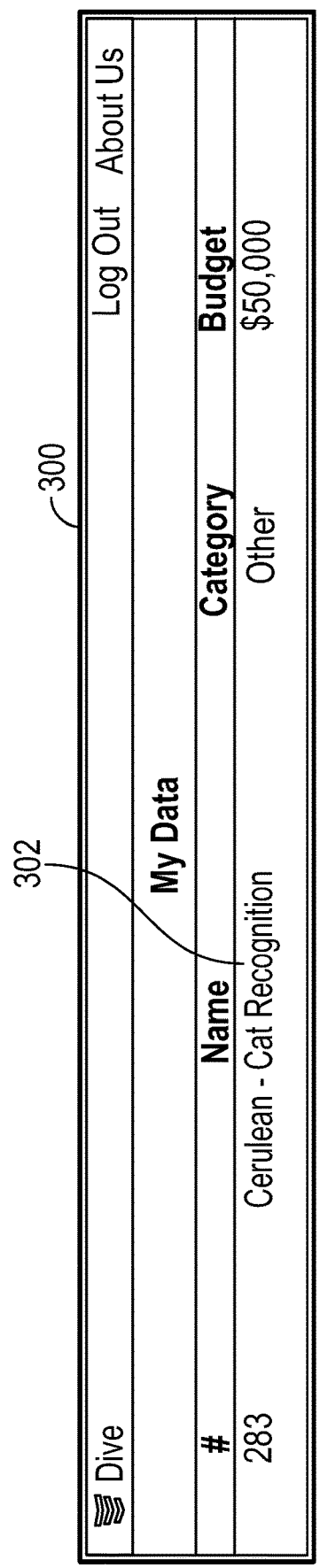

FIG. 3A illustrates an example data set workspace graphical user interface 300 of the crowd sourced database system 100. The graphical user interface 300 can allow an entity to view their current data set requests. Each data set request can include a value associated with it, such as an associated budget. A user can select a data set request 302 to view details associated with the request.

FIG. 3B illustrates an example data set request creation graphical user interface 350. As illustrated, the data set request creation user interface 350 can include form details to be filled out by a user. Example data set request details can include a value associated with the request, such as a budget or a contract value, description(s) regarding the format of submitted data for the request, a minimum user ranking (such as a reputation) required to submit, a total amount of data requested, whether the data set can be private or public, and/or other request-related information. Sample contributions data can be uploaded via the graphical user interface 350. As described herein, the data set request information can be made available to contributors.

FIG. 4A illustrates an example data set contributions graphical user interface 400. The graphical user interface 400 can allow a user to view the data set requests for which a user can potentially make contributions. As shown, the data set contributions user interface 400 can include a first data set request 402, a second data set request 404, and a third data set request 406. A user can select any of the first data set request 402, the second data set request 404, and the third data set request 406 to make a contribution for the respective data request. In some embodiments, if the related topics of the data set match a user's profile, such as a user's tagged interests, the user may be informed about the corresponding data set request.

Figure 4B:

FIG. 4B illustrates an example data set workspace graphical user interface 420. The graphical user interface 420 can allow a user to view at least some contributions to the data set. For example, user selection of the first data set request 402 of FIG. 4A can cause presentation of the data set workspace user interface 420 that corresponds to the first data set request 402. As illustrated, the data set request for the graphical user interface 420 can be for an image data set. As shown, the data set request can specifically be for a cat image data set.

Figure 4C:
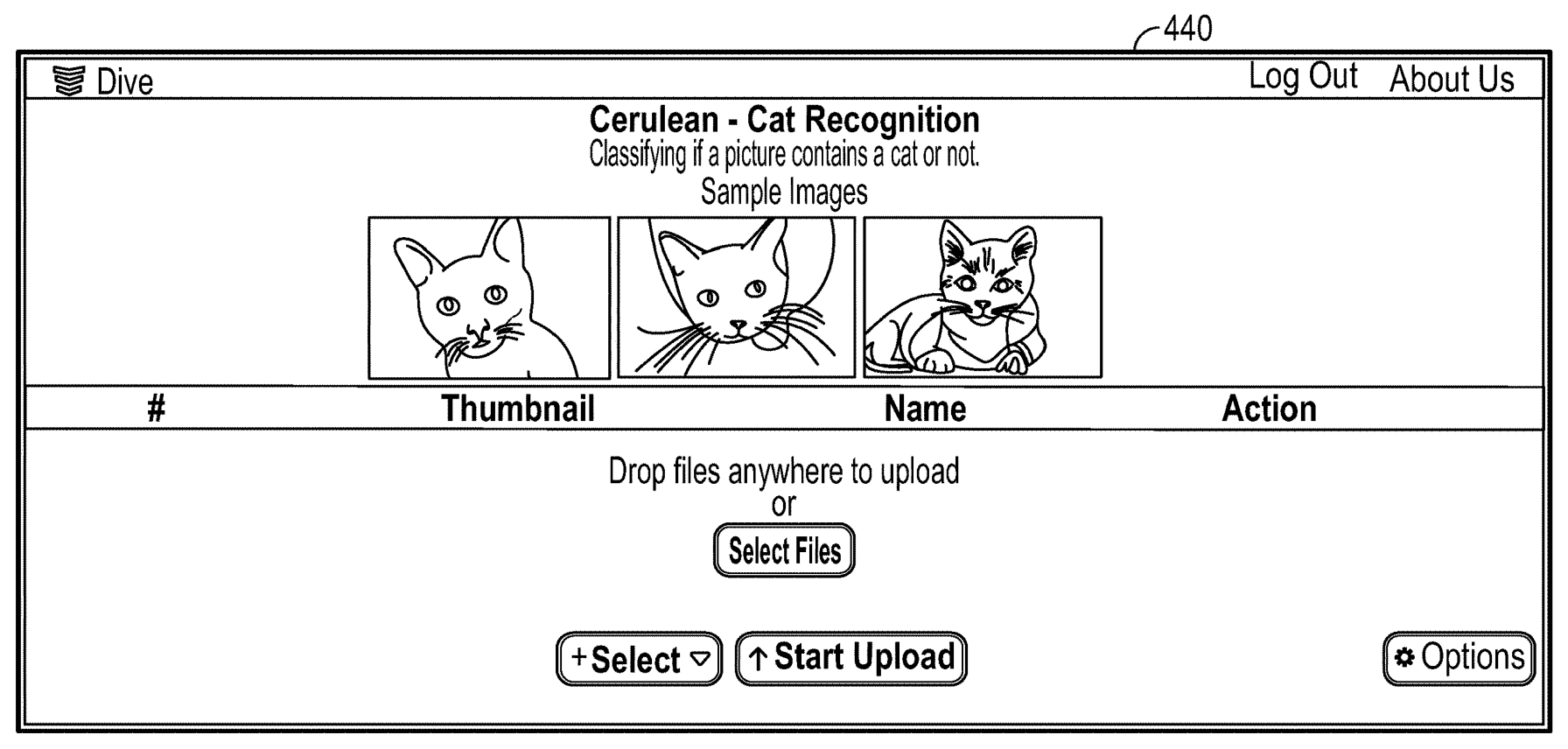

FIG. 4C illustrates an example first contributions upload graphical user interface 440. The graphical user interface 440 can allow a user to upload contribution data. Example contribution data that can be uploaded can include a file, such as an image file. The crowd sourced database system can receive contribution data provided by a user.

FIG. 4D illustrates an example second contributions upload graphical user interface 460. The graphical user interface 460 can allow a user to view recent uploads. Example contribution data that can be uploaded can include multiple files, such as multiple image files. The second contributions upload user interface 460 can be presented subsequent to an upload via the first contributions upload user interface 440.

Figure 5:
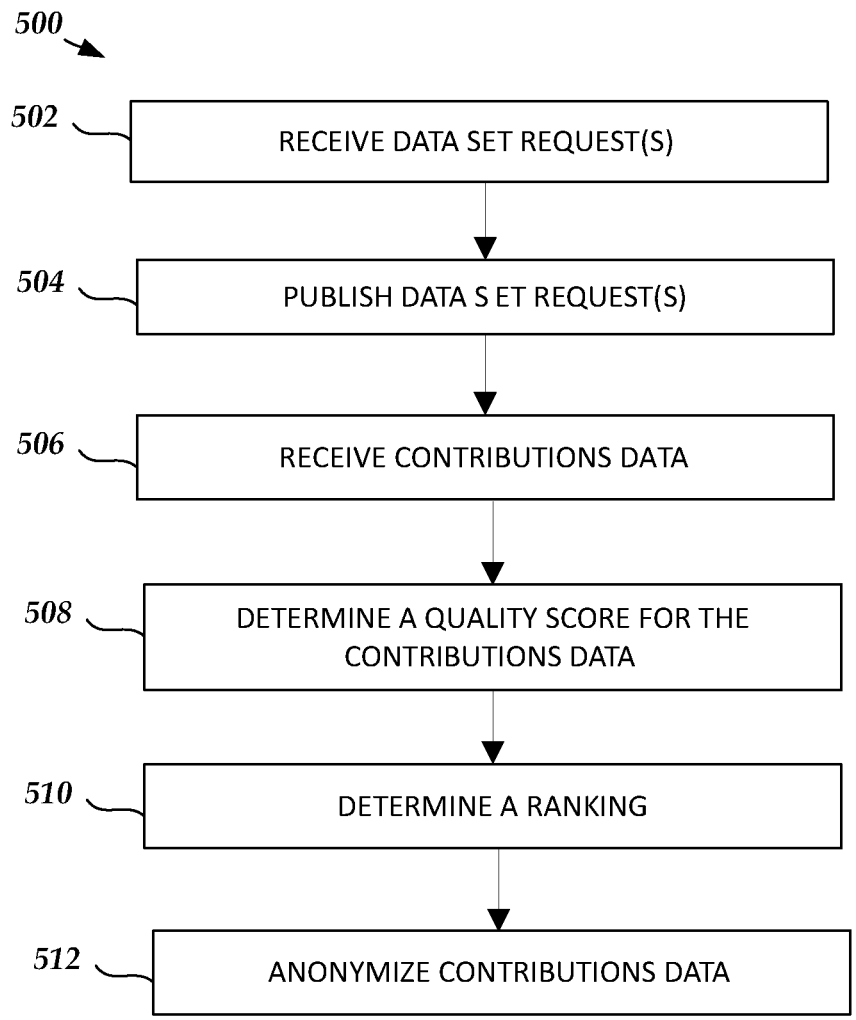
FIG. 5 is a flowchart of an example crowd sourced contributions method, according to some embodiments of the present disclosure.

FIG. 5 is a flowchart of an example crowd sourced contributions method 500, according to some embodiments of the present disclosure. Although the method 500 is described in conjunction with the systems of FIG. 1, any system configured to perform the method, in any order, is within the scope of this disclosure. The method 500 may be performed by the various components of the crowd sourced database system 100 of FIG. 1 as discussed herein, including the contributions server 108 and/or the ranking service 106. Depending on the embodiment, the method 500 may include fewer or additional blocks and/or the blocks may be performed in an order different than is illustrated.

Beginning at block 502, a data set request can be received. A data set request can be received by the contributions server 108, such as via a graphical user interface. An example graphical user interface to receive a data set request is described in further detail above with respect to FIG. 3B. The graphical user interface can include a form that receives details regarding the data set request. As described herein, example data set request details can include a value associated with the request, such as a budget or a contract value, description(s) regarding the format of submitted data for the request, a minimum user ranking (such as a reputation) required to submit, a total amount of data requested, whether the data set can be private or public, and/or other request-related information. The data set request can include a description of a type of data requested, such as a description identifying an image data type or particular types of health records or information.

Example data set requests can be for different types of data, such as, but not limited to, image data, medically related data, clinically related data, geolocation data, financial data, social media data, sentiment or user review data, textual data, natural language processing related data, vehicle or transportation data, or agriculturally related data. In an agricultural context, an example request for data can be for self-reported data from individual farmers on crop health, such as a farmer's general sentiment about their crops. Example image data can include infrared and/or thermal images. Another example request for data can be for sensor data of crops, such as infrared and/or thermal images of crops from infrared and/or thermal cameras.

At block 504, the data set request can be published. A data set request can be published by the contributions server 108, such as being made available via a graphical user interface. An example graphical user interface for publishing the data set request is described in further detail above with respect to FIG. 4A. The contributions server 108 can further publish the data set request by causing presentation of the data set request in a data set contributions graphical user interface, such as the user interface 400 described above with respect to FIG. 4A, to a user computing device. Thus, a user can view a data set request via the contributions server 108.

In some embodiments, a user can receive a notification for a data set request. For example, a user profile can include user preferences that identify interests or categories associated with requests that the user would like to receive. The contributions server 108 can transmit a notification to a user when a data set request is available, which can be based on the user's profile. For example, a user that has specific an interest in nature photography or hiking will be notified when there is an available data set request related to landscape photography or images of waterfalls. Other user information can be used to notify a user about data set requests. The contributions server 108 can recommend a data set request based on location data for a user profile. For example, where images of specific subjects within a geographic area are requested, user profiles that indicate that a user is within that geographic area can be used for notification purposes.

At block 506, contributions data can be received. Contributions data can be received by the contributions server 108 from a user computing device 102. In particular, the contributions server 108 can receive contributions data via a graphical user interface, such as example graphical user interfaces 420, 440, 460 describe above in further detail with respect to FIGS. 4B, 4C, and 4D, respectively. As described herein, example contributions data can include, but is not limited to, image data, sensor data, medically or clinically related data, geolocation data, financial data, social media data, sentiment or user review data, textual data, natural language processing related data, vehicle or transportation data, and/or agriculturally related data. For example, the contributions data can include self-reported data from individual farmers on crop health or sensor data of crops. Thus, one or more users can contribute data to the data set request, such as by uploading contributions data to the contributions server 108. The contributions server 108 can store the contributions data in the contributions database 110.

In some embodiments, contributions data can be received from a third party system 120. A user can authorize use of their third-party maintained records by the crowd sourced database system 100. For example, in a medical context, a patient can authorize their hospital or provider network that includes an electronic health records system to provide their patient records to the crowd sourced database system 100. In a social media context, a user can authorize use of a user profile's posts or pictures from a social media system. Additional details regarding receiving contributions data from a third party system 120 is described in further detail below with respect to FIG. 7.

A user can provide contributions data from a user computing device 102. For example, if there is a data set request for images of a certain kind of object, a user can take a picture with their user computing device 102 and provide it to the contributions server 108. In some embodiments, contributions data can be received from a crowd sourced user application. The crowd sourced user application can be an application that runs on a user computing device 102, such as a smartphone or tablet. The crowd sourced user application can access an image data store on the user computing device 102 to provide images to the contributions server 108. In some embodiments, the crowd sourced user application can automatically recommend images related to an identified image for a data set request. The crowd sourced user application can suggest to upload images that were taken or created within a threshold time period of an identified image. The crowd sourced user application can suggest to upload images that are similar to an identified image. The crowd sourced user application can apply image clustering or image matching techniques to determine similar images. The crowd sourced user application may use an open source API that uses computer vision techniques to determine similar images or to classify images.

At block 508, a quality score can be determined for the contributions data. The ranking service 106 can determine a quality score for the contributions data. An example quality score can include a user generated rating or ranking of the quality of the contributions data. For example, a user can submit a rating of at least some of the contributions data. The ranking service 106 can store the user generated rating for future analysis, such as determining a ranking for the use profile corresponding to the user that submitted the contributions data. In some embodiments, a quality score of contributions data can be generated by a machine learning model. Additional example quality scores include a similarity score (such as a score that indicates the similarity of a user's submissions to previous submissions, for the particular user and for other users) and/or a diversity score (such as a score that indicates the difference of a user's submissions to previous submissions, for the particular user and for other users). Additional details regarding quality scores are described in further detail herein, such as with respect to the ranking model 601 of FIG. 6 described in further detail below.

At block 510, a ranking can be determined for a user profile and/or for a set of contributions data. The ranking service 106 can determine a ranking for user profiles that submitted contributions data for a data request and/or for contributions data. In a crowd sourced environment, data requesters can advantageously have insight into the quality of contributors based on the rankings for user profiles. For example, data requesters can specify a minimum user profile ranking to allow users to submit data for a particular data request. In some embodiments, data requesters can also use the user profile rankings for compensation purposes. The ranking service 106 can determine a ranking for a user profile based at least in part on quality scores of submissions from a corresponding user. For example, those users that submit higher quality data can receive a higher ranking than users that submit lower quality data. A ranking can include a score, such as a numerical value. In some embodiments, machine learning models can generate the rankings for the user profiles. An example ranking model is described in further detail below with respect to FIG. 6.

Rankings can indicate a relative quality of contributions data or a relative reputation of a user profile. For example, a first ranking can indicate that first contributions data has a higher quality level than second contributions data that has a second ranking that is lower than the first ranking. Similarly, another first ranking can indicate that a first user profile has a higher reputation level than a second user profile that has a second ranking that is lower than the first ranking. In some embodiments, the contributions server 108 can present a ranking in a user interface. The ranking can be made available to data set contributors and/or entities that request data.

The determined ranking or scores can be used for one or more purposes. For example, the ranking can be used for certain data set requests that have a minimum ranking requirement to view the data set request. The crowd sourced database system 100 can determine that a ranking exceeds a threshold associated with a particular data request, where the data request's threshold can indicate a minimum value that a user profile must have to view the data set request. The system 100 can authorize access to the data request for the user profile that has the ranking. The system 100 can then cause presentation of the data set request in a user interface, such the data set contributions graphical user interface 400 of FIG. 4A, to a user computing device 102 associated with the user profile. As another example, the system 100 can determine a compensation amount for a user profile based at least in part on a quality score for contributions data. The system 100 can determine an initial compensation amount, such as by multiplying a percentage contribution by a total budget for a particular data set request. The resulting value can then be adjusted by a further amount based on a quality score associated with the particular contribution to the data set request. Thus, user profiles that contribute higher quality data can receive greater compensation than user profiles that contribute lower quality data.

At block 512, contributions data can be anonymized. For example, the anonymization service 112 can anonymize some contributions data. In some contexts, some contributions data (such as medically related data) should not be able to be traceable back to its origin or user. For example, a medical patient who submits their records should not be able to have their identity determined from their data attributes such as height, weight, race, location, etc. The anonymization service 112 can anonymize the data while still maintaining the usefulness of the data. In some embodiments, the anonymization service 112 can introduce some noise to the data (such as adding an inch to height, removing a few pounds from weight) without drastically changing the underlying statistical distribution of the contributions data set. The crowd sourced database system 100 can specify which data types or contribution data sets for data requests should be anonymized. For example, if a data set is requested that contains a request for personal information of users, the crowd sourced database system 100 can anonymize the contributions data set before making the data available to the requesting entity.

In some embodiments, the anonymization service 112 can modify contributions data based on one or more epsilon thresholds. As used herein, in addition to its ordinary and customary meaning, "epsilon threshold" can refer to a number (such as a rational number) that can be used to introduce some noise to contributions data. For example, the anonymization service 112 can anonymize data using a relatively smaller epsilon threshold that can cause the output of the anonymization to have a relatively smaller variance from the original input data. Conversely, the anonymization service 112 can anonymize data using a relatively larger epsilon threshold that can cause the output of the anonymization to have a relatively larger variance from the original input data. Each epsilon threshold can include a data accuracy aspect and data privacy aspect for each data category, where there can be a tradeoff between data accuracy and data privacy for each data category. A user can submit contributions data that includes a first data subset of a first data type (such as the height of the user) and a second data subset of a second data type (such as the location of the user). The anonymization service 112 can generate, from the first data subset, first anonymized data according to a first epsilon threshold for the first data type. For example, if the first data type is for height, a relatively small epsilon threshold can be used, which will vary the data by a smaller amount because height data by itself may not be very identifying. The anonymization service 112 can generate, from the second data subset, second anonymized data according to a second epsilon threshold for the second data type. With a second data type such as location, if a user's location is only obscured by a few miles, it may still be highly traceable back to them, so a relatively larger epsilon threshold may be used to obscure the data more. Additional details regarding anonymizing privacy data can be found in "Calibrating Noise to Sensitivity in Private Data Analysis" by Cynthia Dwork, Frank McSherry, Kobbi Nissim, and Adam Smith (2006).

Figure 6:
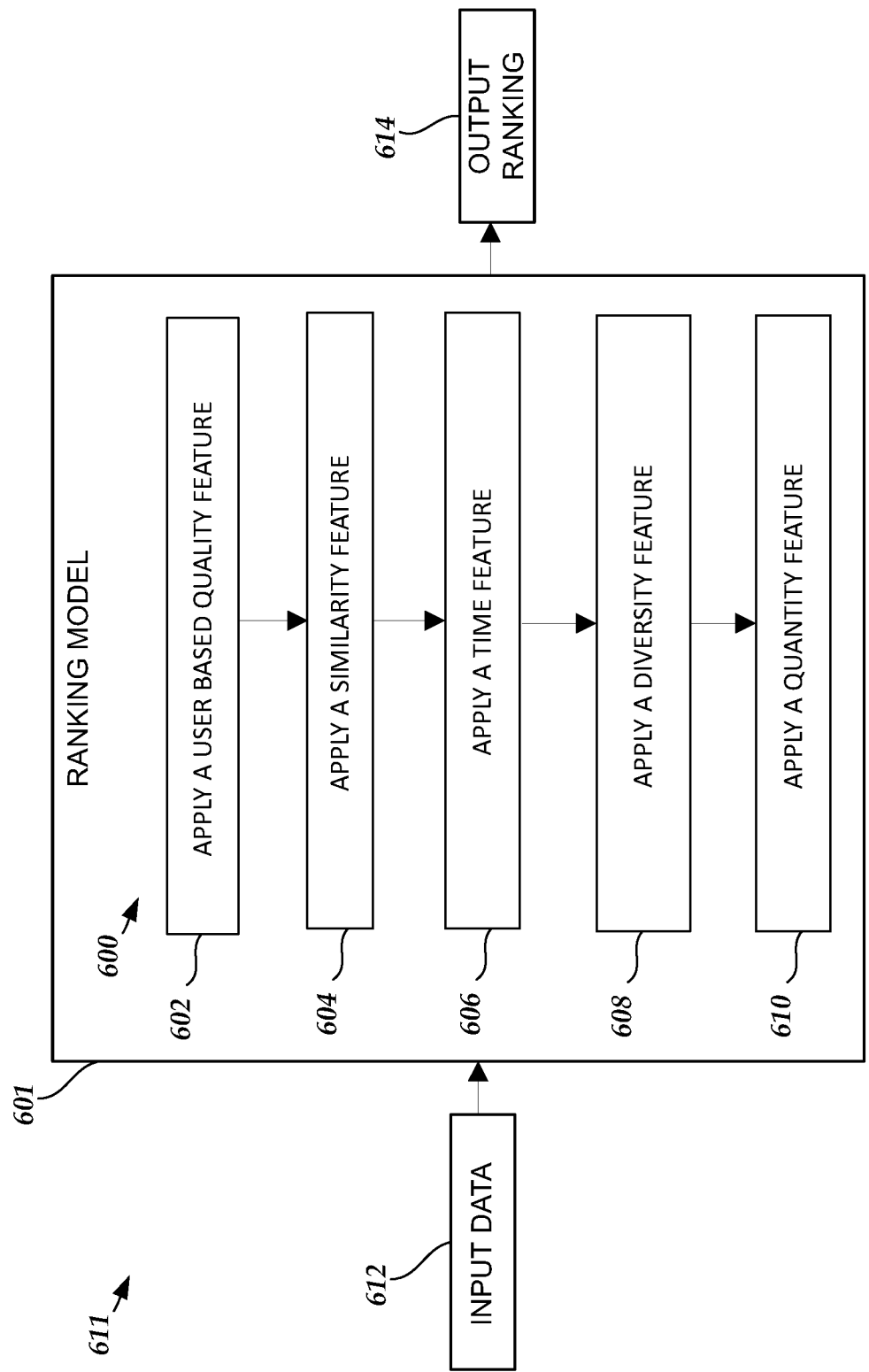
FIG. 6 depicts an example ranking model, according to some embodiments of the present disclosure.

FIG. 6 depicts an example ranking model 601. In the embodiment of FIG. 6, the computing environment 611 can include input data 612, the ranking model 601, and a ranking 614. The ranking model 601 can receive the input data 612 and output the ranking 614. Example input data 612 can include, but is not limited to, data related to a user profile and/or user contributions data. An example ranking 614 can include, but is not limited to, a score for a user profile and/or contributions data. As described herein, the ranking model 601 can be generated from machine learning techniques, such as supervised or semi-supervised machine learning.

The ranking model 601 can include a ranking method 600. Although the method 600 is described in conjunction with the systems of FIG. 1, any system configured to perform the method, in any order, is within the scope of this disclosure. The method 600 may be performed by the various components of the crowd sourced database system 100 of FIG. 1 as discussed herein, such as the ranking service 106. Depending on the embodiment, the method 600 may include fewer or additional blocks and/or the blocks may be performed in an order different than is illustrated. For example, in executing the ranking method 600, the ranking service 106 can apply a subset of the features described in the method 600, such as one or more of user based quality, similarity, time, diversity, or quantity features.

Beginning at block 602, a user based quality feature can be applied. The ranking service 106 can apply the user based quality feature to input data such as a user profile. The block 602 can be similar to the block 508 of FIG. 5 that determines a quality score. The ranking service 106 can determine a user based quality feature associated with user generated ratings or ranking of the quality of contributions data from a user profile. For example, the ranking service 106 can determine a higher user based quality feature for a user profile if other users have rated the quality of the user profile with high scores (such as highly rated image submissions). In an agricultural context, other users can rate the quality of the sensor data of crops, such as infrared and/or thermal images of crops.

At block 604, a similarity feature can be applied. The ranking service 106 can apply a similarity feature to input data such as contributions data. This block 604 for applying a similarity feature can be similar to the block 508 of FIG. 5 that determines a quality score. The ranking service 106 can determine the similarity of a user's submissions to previous submissions, for the particular user and/or for other users. In an image context, the ranking service 106 can compare multiple images to determine whether the same or similar images are being submitted. In an agricultural context, the ranking service 106 can compare sensor data of crops (such as infrared and/or thermal images of crops) with other sensor data to check for duplicates. For example, the ranking service 106 can apply a mean squared error algorithm for an image comparison. Another example algorithm for image comparison can use mean squared error and color distance combined with a K-nearest neighbor algorithm. For textual submissions, the ranking service 106 can apply textual comparison algorithms. In some embodiments, comparing many images may be computationally difficult or expensive. The ranking service 106 can use locality-sensitive hashing to improve image comparison performance. The ranking service 106 can has hash differently the different inputs, such as images, so that similar images will be placed into similar buckets. Locality-sensitive hashing can improve the performance time to compare large amounts of images. The ranking service 106 can use a data clustering and/or nearest neighbor searching algorithm for data comparisons.

In some embodiments, the ranking service 106 can apply a similarity feature to user submitted data and other data. The ranking service 106 can compare user submitted data to other data to determine the validity and/or quality of the data. The ranking service 106 can generate or receive a summary value for user submitted data and other data. In particular, the ranking service 106 can generate a score based on the respective summary values. For example, in an agricultural context, the ranking service 106 can compare user submitted sensor data of crops (such as high-resolution infrared and/or thermal images of crops from local sensors) with reference sensor data (such as low-resolution infrared and/or thermal images of the same plots from satellite data). In particular, the ranking service 106 can generate or receive a respective NDVI values for (i) the user submitted sensor data of crops and (ii) the reference sensor data. The ranking service 106 can compare the respective NDVI values, and correspondence between the respective NDVI values can be used to validate the user submitted data. For example, if the average NDVI value of the local high-resolution infrared and/or thermal data is outside of a threshold range of the NDVI value calculated from the satellite data, then the output ranking from the ranking service 106 can be lower, which reflects the likelihood that the user submitted data is fake and/or inaccurate. Conversely, if the NDVI value(s) for the user submitted data is consistent and/or within a reasonable range of respective NDVI value(s) for the reference data, then the output ranking from the ranking service 106 can be higher, which can reflect a likelihood that the user submitted data is valid and/or accurate.

At block 606, a time feature can be applied. The ranking service 106 can apply a time feature to input data such as a user profile. The ranking service 106 can determine a value associated with an amount of time that a user profile has been active on the crowd sourced database system 100. For example, the ranking service 106 can determine an amount of time spent on the platform, such as a cumulative amount of time and/or some other quantification or statistical measure related to time. For example, the ranking service 106 can take into account for the time feature that a user profile is new, such as by recently joining and/or recently contributing data for the first time. As another example, the ranking service 106 can take into account for the time feature that a user profile has been on the platform for a substantial period of time, such as an amount of time being greater than some threshold.

At block 608, a diversity feature can be applied. The ranking service 106 can apply a diversity feature to input data such as a contributions data. The block 608 for applying a diversity feature can be similar to the block 604 that determines a similarity feature and/or block 508 of FIG. 5 that determines a quality score. Instead of determining similarity of submitted data, the ranking service 106 can determine the inverse, namely, how different first data is from second data. The first data and the second data can be from the same user profile. For example, the ranking service 106 can determine that a user profile is submitting data that is sufficiently different from previous data submissions from the user profile. In the image example, the diversity feature can indicate that a user is not submitting the same images multiple times. Another example diversity feature can compare first data from a first user profile and second data from a second user profile. The ranking service 106 can determine that a user profile is submitting data that is sufficiently different from other submissions from other user profiles. In some embodiments, the ranking service 106 can apply comparison algorithms to determine diversity, such as the algorithms described above with respect to the similarity feature block 604, which can include, but is not limited to a mean square error algorithm or textual comparison algorithms.

At block 610, a quantity feature can be applied. The ranking service 106 can apply a quantity feature to input data such as a user profile. The ranking service 106 can determine a value associated with a quantity of submissions from a user profile. For example, the ranking service 106 can determine a quantity of submissions from a user profile, such as a cumulative quantity of submissions (such as 100 or 1000 image submissions or 1 gigabyte or 10 gigabytes of data submissions) and/or some other quantification or statistical measure related to a quantity. For example, the ranking service 106 can determine a higher quantity feature based on a quantity of submissions (such as 1000 submitted images instead of 100) or a higher resolution of data (such as higher resolution image data).

In some embodiments, the ranking model 601 can be generated from machine learning techniques, such as supervised or semi-supervised machine learning. The ranking service 106 can train the ranking model 601 using a training set that includes training contributions data. The ranking service 106 can train the ranking model 601 by applying one or more of the features described at the blocks 602, 604, 606, 608, and 610. The ranking model 601 can include a random forest model, a decision tree, or a support vector machine. In some embodiments, the decision tree model can output a numeric value for the output ranking. An example decision tree model can include regression or classification models in the form of a tree structure. The decision tree model can break down a dataset into smaller and smaller subsets while at the same time an associated decision tree is incrementally developed. The decision tree model can be a tree with decision nodes and leaf nodes. The ranking service 106 can take an input training dataset with features and labels into a decision tree and formulate a set of rules, which will be used to make a prediction and/or calculation.

In some embodiments, the ranking model 601 can include a random forest model. The ranking service 106 can generate a random forest model by using multiple decision trees at training time and can output a combined decision tree, such as the mode of the classes (classification) or mean prediction (regression) of the individual trees. The ranking service 106 can train the ranking model 601 as a random forest by applying one or more of the features described at the blocks 602, 604, 606, 608, and 610. The ranking service 106 can train a first decision tree from a first subset of the features. The ranking service 106 can train a second decision tree from a second subset of the features. The ranking service 106 can generate a combined decision tree from the first decision tree and the second decision tree. In contrast to a decision tree, the random forest model randomly or pseudo-randomly selects observations and features to build several decision trees and then averages the results. A downside of decision trees is that they might suffer from overfitting. A random forest model can prevent overfitting by creating random or pseudo-random subsets of the features, building smaller trees using these subsets, and combining the subtrees.

Figure 7:
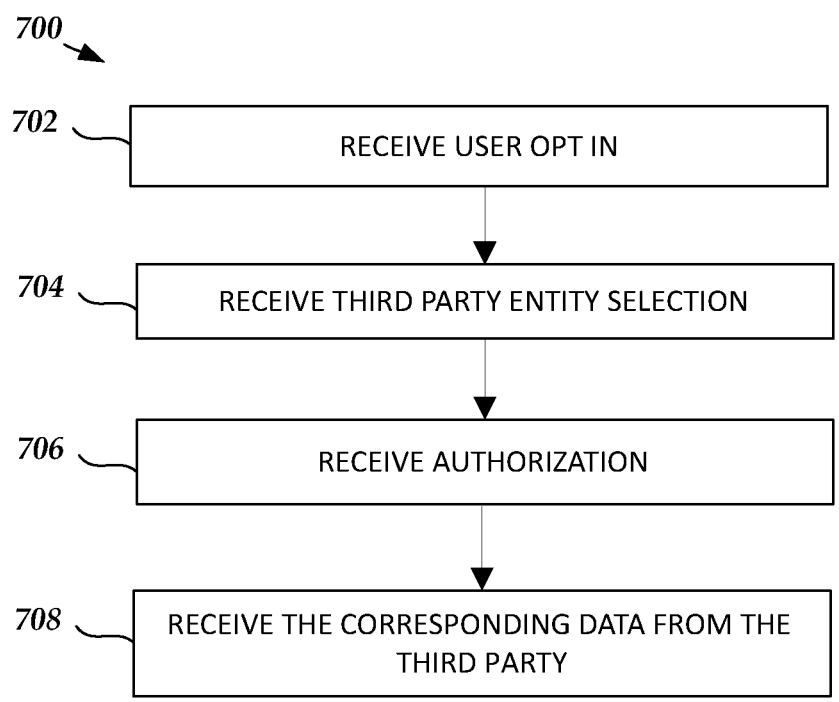
FIG. 7 is a flowchart of an example authorization and access method for third-party hosted data, according to some embodiments of the present disclosure.

FIG. 7 is a flowchart of an example authorization and access method for third-party hosted data method 700, according to some embodiments of the present disclosure. Although the method 700 is described in conjunction with the systems of FIG. 1, any system configured to perform the method, in any order, is within the scope of this disclosure. The method 700 may be performed by the various components of the crowd sourced database system 100 of FIG. 1 as discussed herein, such as the contributions server 108. Depending on the embodiment, the method 700 may include fewer or additional blocks and/or the blocks may be performed in an order different than is illustrated.

Beginning at block 702, a user opt-in confirmation can be received. A user can provide an opt-in confirmation to allow access to their records to the contributions server 108. For example, a user can be provided an opt-in graphical user interface. The user can provide an explicit confirmation via the graphical user interface. The crowd sourced database system 100 may also store any opt-in or authorization information in the contributions database 110 as a record that a user has authorized the use of their personal information for regulatory and/or audit purposes.

At block 704, a third party entity selection can be received. The contributions server 108 can receive the third party entity selection. A user can provide or select their third party entity via a graphical user interface. In a medical context, a user can provide or select their hospital or network. In another example, a user can select a specific social media application or site as their third party entity selection. In some embodiments, the opt-in graphical user interface can redirect to a login page with the third party entity, such as a hospital website. In some embodiments, the available third party entities can be those entities that the crowd sourced database system 100 is configured to communicate with, such as specific electronic medical record software applications and/or specific social media systems.

At block 706, an authorization can be received. The contributions server 108 can receive user authorization for specific data access permissions. For example, a user can authorize all of their records (such as medical information) to be available to the crowd sourced database system 100. As another option, a user can authorize some of their data to be used on a request-by-request basis. User compensation can vary based on the type of granted data permissions. For example, if a data set for a certain type of data is requested, such as wrist x-ray scans, a user with that type of data that has granted use of their data can be notified that their data is being used; and the user can be compensated accordingly. This can result in an on-demand downloading or retrieval of user data. On-demand downloading can advantageously provide more privacy since user information may not be stored locally until requested. A user can be compensated more when the data is actually requested, however, it may take longer for any specific type of data to be requested.

At block 708, data can be received from the third party entity. The contributions server 108 can receive data from the third party entity. For example, if a user has authorized access to all or some of their data, the contributions server 108 can receive the corresponding data from the third party system 120. In some embodiments, a user authorization can generate an authorization code, which can be provided by the contributions server 108 to the third party system 120 to authenticate the user permissions. As described above, if on-demand access is provided, as new data becomes available that has been authorized and that corresponds to an open data set request, the new data can be transmitted to the contributions server 108. Further, the crowd sourced database system 100 can communicate with the third party system 120 via an Application Programming Interface. The crowd sourced database system 100 can be configured to communicate with and/or receive particular data formats from specific third party systems, such as those systems that use specific electronic medical record software applications or specific social media systems.

FIG. 8 depicts a general architecture of a computing system 800 (sometimes referenced herein as the crowd sourced database system 100, the ranking service 106, the contributions server 108, and/or the anonymization service 112). The computing system 800 or components of the computing system 800 may be implemented by any of the devices or components discussed herein. The general architecture of the computing system 800 depicted in FIG. 8 includes an arrangement of computer hardware and software components that may be used to implement aspects of the present disclosure. The computing system 800 may include many more (or fewer) elements than those shown in FIG. 8. It is not necessary, however, that all of these elements be shown in order to provide an enabling disclosure. As illustrated, the computing system 800 includes one or more hardware processors 804, a communication interface 818, a computer readable medium storage device 810, one or more input devices 814A (such as a touch screen, mouse, keyboard, etc.), one or more output devices 816A (such as a monitor, screen, or display), and memory 806, some of which may communicate with one another by way of a communication bus 802 or otherwise. The communication interface 818 may provide connectivity to one or more networks or computing systems. The hardware processor(s) 804 may thus receive information and instructions from other computing systems or services via the network 822.

The memory 806 may contain computer program instructions (grouped as modules or components in some embodiments) that the hardware processor(s) 804 executes in order to implement one or more embodiments. The memory 806 generally includes RAM, ROM or other persistent, auxiliary or non-transitory computer-readable media. The memory 806 may store an operating system that provides computer program instructions for use by the hardware processor(s) 804 in the general administration and operation of the computing system 800. The memory 806 may further include computer program instructions and other information for implementing aspects of the present disclosure. In addition, memory 806 may include or communicate with the storage device 810. A storage device 810, such as a magnetic disk, optical disk, or USB thumb drive (Flash drive), etc., is provided and coupled to the bus 802 for storing information, data, or instructions.

The memory 806 may also be used for storing temporary variables or other intermediate information during execution of instructions to be executed by hardware processor(s) 804. Such instructions, when stored in storage media accessible to hardware processor(s) 804, render the computing system 800 into a special-purpose machine that is customized to perform the operations specified in the instructions.

In general, the word "instructions," as used herein, refers to logic embodied in hardware or firmware, or to a collection of software modules, possibly having entry and exit points, written in a programming language, such as, but not limited to, Java, Scala, Lua, C, C++, or C#. A software module may be compiled and linked into an executable program, installed in a dynamic link library, or may be written in an interpreted programming language such as, but not limited to, BASIC, Perl, or Python. It will be appreciated that software modules may be callable from other modules or from themselves, or may be invoked in response to detected events or interrupts. Software modules configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules or computing device functionality described herein are preferably implemented as software modules, but may be represented in hardware or firmware. Generally, the instructions described herein refer to logical modules that may be combined with other modules or divided into sub-modules despite their physical organization or storage.

The term "non-transitory media," and similar terms, as used herein refers to any media that store data or instructions that cause a machine to operate in a specific fashion. Such non-transitory media may comprise non-volatile media or volatile media. Non-volatile media includes, for example, optical or magnetic disks, such as the storage device 810. Volatile media includes dynamic memory, such as the main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise the bus 802. Transmission media can also take the form of acoustic or light waves, such as those generated during radio-wave and infrared data communications.

The computing system 800 also includes a communication interface 818 coupled to the bus 802. The communication interface 818 provides a two-way data communication to the network 822. For example, communication interface sends and receives electrical, electromagnetic, or optical signals that carry digital data streams representing various types of information via cellular, packet radio, GSM, GPRS, CDMA, WiFi, satellite, radio, RF, radio modems, ZigBee, XBee, XRF, XTend, Bluetooth, WPAN, line of sight, satellite relay, or any other wireless data link.

The computing system 800 can send messages and receive data, including program code, through the network 822 and the communication interface 818. A computing system 800 may communicate with other computing devices 830 via the network 822.

The computing system 800 may include or be implemented in a distributed computing environment including several computer systems that are interconnected using one or more computer networks. The computing system 800 could also operate within a computing environment having a fewer or greater number of devices than are illustrated in FIG. 8.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA, other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A system comprising:
  a non-transitory computer storage medium configured to at least store computer-executable instructions; and
  one or more computer hardware processors in communication with the non-transitory computer storage medium, the one or more computer hardware processors configured to execute the computer-executable instructions to at least:
  receive a data set request for medically related data;
  publish, in a data set contributions graphical user interface, the data set request, wherein to publish the data set request further comprises:
    cause presentation of the data set request in the data set contributions graphical user interface to a first user computing device associated with a first user profile;
  receive, from the first user computing device, first contributions data associated with the data set request,
    wherein the first contributions data comprises medically related data,
    wherein the first contributions data further comprises a first subset of data of a first data type and a second subset of data of a second data type,
    wherein the first data type is a physical or physiological measurement of a patient,
    wherein the second data type is an image data type;
  determine a first quality score for the first contributions data;
  determine a first ranking of the first user profile based at least in part on the first quality score;

generate, from the first subset of data, first anonymized data according to a first epsilon threshold for the first data type, wherein to generate the first anonymized data further comprises:
    randomly or pseudo-randomly generate a first value corresponding to the first epsilon threshold; and
    add the first value to the first subset of data or subtract the first value from the first subset of data; and
generate, from the second subset of data, second anonymized data according to a second epsilon threshold for the second data type, wherein to generate the second anonymized data further comprises:
    randomly or pseudo-randomly generate noise data corresponding to the second epsilon threshold, the second epsilon threshold different from the first epsilon threshold; and
    add from the noise data to image data from the second subset of data.

2. The system of claim 1, wherein the first quality score comprises a user generated rating of at least some of the first contributions data.

3. The system of claim 1, wherein the first ranking comprises a score.

4. The system of claim 1, wherein the one or more computer hardware processors are further configured to:
generate a ranking model comprising:
  a first feature corresponding to a user based ranking of contributions data;
  a second feature corresponding to a similarity between first contributions data and second contributions data;
  a third feature corresponding to time spent using a graphical user interface;
  a fourth feature corresponding to a diversity between third contributions data and fourth contributions data; and
  a fifth feature corresponding to a quantity of submitted contributions data, wherein to determine the first ranking of the first user profile further comprises:
    apply the ranking model to the first user profile that generates the first ranking.

5. The system of claim 1, wherein the one or more computer hardware processors are further configured to:
train a ranking model using a training set comprising a plurality of training contributions data, wherein to train the ranking model further comprises an application of a plurality of features on the training set, the plurality of features including at least:
  a first feature corresponding to a user based ranking of contributions data;
  a second feature corresponding to a similarity between first training contributions data and second training contributions data;
  a third feature corresponding to time spent using a graphical user interface;
  a fourth feature corresponding to a diversity between third training contributions data and fourth training contributions data; and
  a fifth feature corresponding to a quantity of submitted contributions data, wherein to determine the first ranking of the first user profile further comprises:
    apply the ranking model to the first user profile that generates the first ranking.

6. The system of claim 5, wherein to train the ranking model further comprises:
train a first decision tree from a first subset of the plurality of features;
train a second decision tree from a second subset of the plurality of features; and
generate a combined decision tree from the first decision tree and the second decision tree, wherein the ranking model comprises the combined decision tree.

7. The system of claim 5, wherein the ranking model comprises at least one of: a random forest model, a decision tree, or a support vector machine.

8. The system of claim 1, wherein the one or more computer hardware processors are further configured to:
determine that the first ranking exceeds a threshold associated with a second data set request;
authorize access to the second data set request for the first user profile; and
cause presentation of the second data set request in the data set contributions graphical user interface to the first user computing device associated with the first user profile.

9. The system of claim 1, wherein the one or more computer hardware processors are further configured to:
determine a first compensation amount for the first user profile based at least in part on the first quality score.

10. A computer-implemented method comprising:
receiving a data set request;
publishing, in a data set contributions graphical user interface, the data set request, wherein publishing the data set request further comprises:
  causing presentation of the data set request in the data set contributions graphical user interface to a first user computing device associated with a first user profile;
  receiving, from the first user computing device, first contributions data associated with the data set request,
    wherein the first contributions data comprises medically related data,
    wherein the first contributions data further comprises a first subset of data of a first data type and a second subset of data of a second data type,
    wherein the first data type is a physical or physiological measurement of a patient,
    wherein the second data type is an image data type;
determining a first quality score for the first contributions data;
determining a first ranking of the first user profile based at least in part on the first quality score;
generating, from the first subset of data, first anonymized data according to a first epsilon threshold for the first data type, wherein generating the first anonymized data further comprises:
  randomly or pseudo-randomly generating a first value corresponding to the first epsilon threshold; and
  adding the first value to the first subset of data or subtract the first value from the first subset of data; and
generating, from the second subset of data, second anonymized data according to a second epsilon threshold for the second data type, wherein generating the second anonymized data further comprises:
  randomly or pseudo-randomly generating noise data corresponding to the second epsilon threshold, the second epsilon threshold different from the first epsilon threshold; and
  adding from the noise data to image data from the second subset of data.

11. The computer-implemented method of claim 10, wherein the first quality score comprises a user generated rating of at least some of the first contributions data.

12. The computer-implemented method of claim 10, wherein the first ranking comprises a score.

13. The computer-implemented method of claim 10, further comprising:
generating a ranking model comprising:
a first feature corresponding to a user based ranking of contributions data;
a second feature corresponding to a similarity between first contributions data and second contributions data;
a third feature corresponding to time spent using a graphical user interface;
a fourth feature corresponding to a diversity between third contributions data and fourth contributions data; and
a fifth feature corresponding to a quantity of submitted contributions data, wherein determining the first ranking of the first user profile further comprises:
applying the ranking model to the first user profile that generates the first ranking.

14. The computer-implemented method as of claim 10, further comprising:
training a ranking model using a training set comprising a plurality of training contributions data, wherein training the ranking model further comprises an application of a plurality of features on the training set, the plurality of features including at least:
a first feature corresponding to a user based ranking of contributions data;
a second feature corresponding to a similarity between first training contributions data and second training contributions data;
a third feature corresponding to time spent using a graphical user interface;
a fourth feature corresponding to a diversity between third training contributions data and fourth training contributions data; and
a fifth feature corresponding to a quantity of submitted contributions data, wherein determining the first ranking of the first user profile further comprises:
applying the ranking model to the first user profile that generates the first ranking.

15. The computer-implemented method of claim 14, wherein training the ranking model further comprises:
training a first decision tree from a first subset of the plurality of features;
training a second decision tree from a second subset of the plurality of features; and
generating a combined decision tree from the first decision tree and the second decision tree, wherein the ranking model comprises the combined decision tree.

16. The computer-implemented method of claim 10, further comprising:
determining that the first ranking exceeds a threshold associated with a second data set request;
authorizing access to the second data set request for the first user profile; and
causing presentation of the second data set request in the data set contributions graphical user interface to the first user computing device associated with the first user profile.

* * * * *